US006243701B1

(12) United States Patent
Shih et al.

(10) Patent No.: US 6,243,701 B1
(45) Date of Patent: Jun. 5, 2001

(54) SYSTEM AND METHOD FOR SORTING CHARACTER STRINGS CONTAINING ACCENTED AND UNACCENTED CHARACTERS

(75) Inventors: Yung-Ho Shih, Bellevue; Daniel Boone, Redmond; Guy Barker, Kirkland; Kevin Timothy Shields, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/107,089

(22) Filed: Jun. 29, 1998

(51) Int. Cl.[7] .................................................. G06F 7/00
(52) U.S. Cl. .................................. 707/7; 707/101
(58) Field of Search ..................... 712/1; 707/7, 101

(56) References Cited

U.S. PATENT DOCUMENTS

| | | | | |
|---|---|---|---|---|
| 4,587,628 | * | 5/1986 | Archer | 709/328 |
| 4,873,625 | * | 10/1989 | Archer | 707/7 |
| 4,939,639 | * | 7/1990 | Lee | 707/7 |
| 5,615,366 | * | 3/1997 | Hansen | 707/7 |
| 5,926,787 | * | 7/1999 | Bennett | 704/235 |

\* cited by examiner

*Primary Examiner*—Eric Coleman
(74) *Attorney, Agent, or Firm*—Lee & Hayes, PLLC

(57) ABSTRACT

A system and method for sorting accented character strings involves creating an expanded character string containing the characters in their base form (without accents) and corresponding ordinal values indicating whether the base characters are accented or unaccented. The ordinal values are assigned in a manner that differentiates accented from unaccented characters as well as one type of accented character from another. The expanded character strings are then sorted, first according to their base characters and then according to their ordinal values.

20 Claims, 3 Drawing Sheets

SYSTEM AND METHOD FOR SORTING CHARACTER STRINGS CONTAINING ACCENTED AND UNACCENTED CHARACTERS

TECHNICAL FIELD

This invention relates to systems and methods for sorting character strings (e.g., words and names), and particularly, to sorting character strings that contain combinations of accented and unaccented characters.

BACKGROUND

Conventional sorting algorithms are designed to sort character strings (e.g., words, phrases, names, etc.) alphabetically according to the characters within the strings. However, in some languages, non-character symbols or marks are often added to characters to modify the pronunciation of the characters or the string as a whole. One common type of pronunciation modifier is an accent. Accents are common in many non-English languages, such as Danish, Latin, German, and Japanese.

Computerized sorting routines have a drawback in that they may mishandle character strings that contain a combination of accented and unaccented characters. Consider the Japanese case. The Japanese language includes three character sets: Kanji, Hiragana, and Katakana. The latter two character sets—Hiragana and Katakana—are collectively known as Kana characters. Kana characters include special accented characters known as "dakuten" and "handakuten" characters.

In each of the Hiragana and Katakana character sets, there are twenty dakuten characters and five handakuten characters. Dakuten characters appear identical to a companion set of Kana characters except for a small double slash accent that appears in the upper right hand corner of the character. Handakuten characters appear identical to five of the dakuten characters except for replacing the small double slash accent with a small circle accent.

Conventional sorting routines are effective at sorting Kanji-only character strings and Kana-only character strings. However, problems arise when Kanji and Kana characters are mixed in the string. The sorting routines give more weight to differences between Kanji characters in two character strings than that of dakuten and handakuten characters. As a result, the sorting routines often yield strings that are ordered incorrectly and not reflecting how such character strings would appear in a Japanese dictionary or telephone book.

Accordingly, there is a need to improve processes for sorting accented characters. In the Japanese case, the goal is to sort the strings identically to how they would be listed in a Japanese dictionary or telephone book.

SUMMARY

This invention concerns a technique for sorting character strings containing characters that are either unmodified or modified by one or more pronunciation modifiers (e.g., accents). The technique involves creating an expanded character string containing the characters in their base form (without the pronunciation modifiers) and ordinal values indicating whether the base characters are unmodified or modified with one of the one or more pronunciation modifiers. The process forms the base characters by removing the pronunciation modifiers from the character string. Ordinal values are then assigned to corresponding ones of the base characters, whereby the ordinal values differentiate among the base characters that are unmodified and those that are modified. The ordinal values also differentiate among the base characters that are modified by different pronunciation modifiers. The process concatenates the base characters and their corresponding ordinal values to form the expanded character string.

Once the character strings are expanded, the process sorts the expanded character strings. The process first sorts the strings according to the base characters and secondly according to the ordinal values.

DETAILED DESCRIPTION

This invention concerns a system and method for sorting character strings (e.g., words, phrases, names, etc.) that employ accented characters. The sorting system and method can be implemented in a wide variety of products, including software products (e.g., word processing programs, database programs, address book programs, and so forth) and computing devices (e.g., handheld portable computers). The system and method are described generally in the context of a software product configured to execute on a computer and in particular, a handheld computing device.

Figure 1:
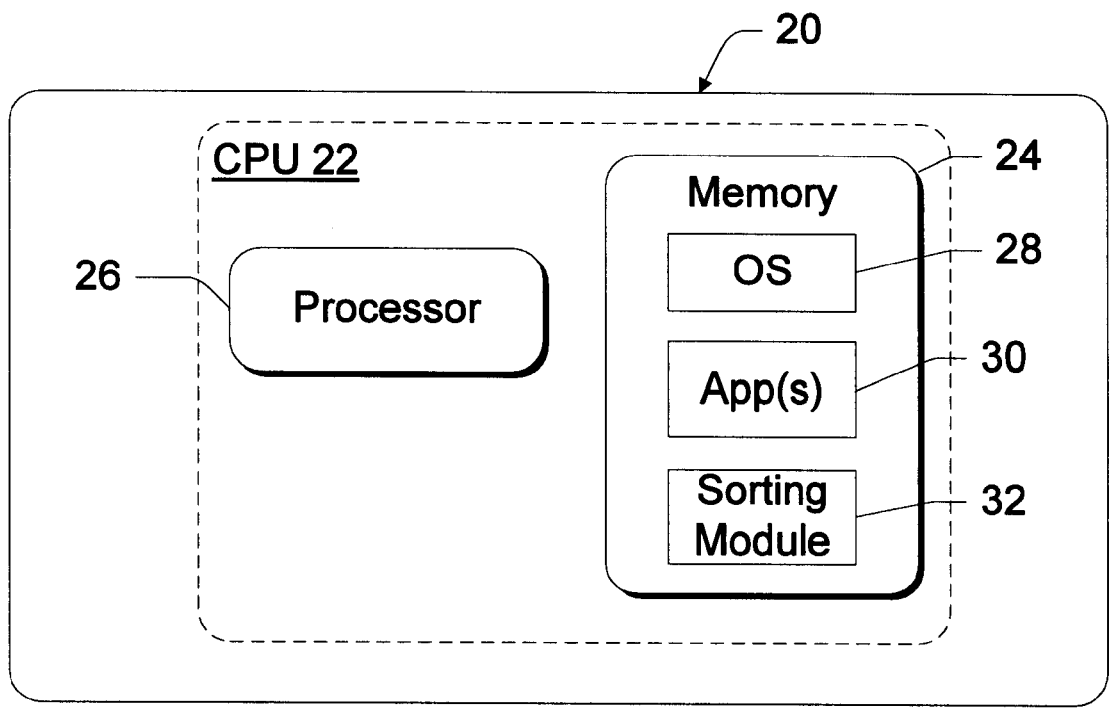
FIG. 1 is a block diagram of functional components in a computing device.

FIG. 1 shows functional components of a computing device 20. It has a central processing unit (CPU) 22 with a memory 24 and a processor 26. The memory 24 generally includes both volatile memory (e.g., RAM) and non-volatile memory (e.g., ROM, PCMCIA cards, memory drives, etc.). An operating system 28 resides in the memory 24 and executes on the processor 26. The operating system can be any type of operating system, including Windows brand operating systems from Microsoft Corporation (e.g., Windows CE, Windows 98, Windows NT, etc.), Unix-based operating systems, Macintosh operating systems from Apple, and various other types of operating systems.

One or more application programs 30 are stored in memory 24 and run on the operating system 28 during execution. Examples of applications include email programs, scheduling programs, personal information management programs, address book programs, database programs, word processing programs, spreadsheet programs, Internet browser programs, and so forth.

The computing device has a sorting module 32 that is capable of alphabetically sorting character strings. Although illustrated as a separate program for discussion purposes, the sorting module 32 is preferably implemented in the operating system 28 as a module that can be dynamically called by the various programs 30. Alternatively, the sorting module 32 can be incorporated into the programs 30.

The sorting module 32 is effective at sorting any character string that contains both unmodified characters and modified characters. In some languages, non-character symbols or marks are added to the character string to modify the pronunciation of the character, word, or phrase. One common type of pronunciation modifier is an accent. Accented characters are common in non-English languages, such as diacritics in Danish and dakuten and handakuten characters in Japanese. For discussion purposes, the sorting module 32 is described in the context of sorting character strings with accented characters. It is noted, however, that the process implemented by the sorting module may be more generally applied to all types of pronunciation modifiers, and are not simply limited to accents.

Figure 2:
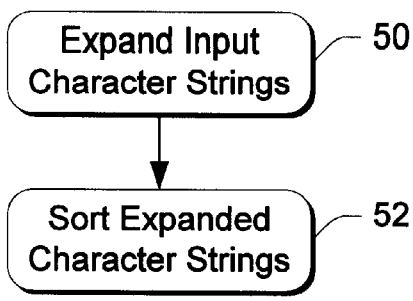
FIG. 2 is flow diagram showing steps in a method for sorting character strings containing characters that are either modified or unmodified by one or more pronunciation modifiers.

FIG. 2 shows steps in a sorting method implemented by the sorting module 32. The sorting method involves two general steps. At step 50, the sorting module 32 expands an input character string into an expanded character string that accounts for pronunciation modifiers. The sorting module 32 converts each character in the input character string into a base character plus a corresponding ordinal value. Unmodified characters are assigned one ordinal value while characters modified by a pronunciation modifier are assigned different ordinal values.

As an example, Japanese Kana characters are parsed into a base Kana character and different ordinal values depending upon whether the character is pure Kana (i.e., an ordinal value of zero), the character is accented with dakuten (i.e., an ordinal value of one), or the character is accented with handakuten (i.e., an ordinal value of two). Step 50 is described below in more detail with reference to FIG. 3.

At step 52, the sorting module 32 sorts the expanded character strings. The sorting module 32 first sorts the strings according to their base characters and then secondly according to their ordinal values. For various strings of Japanese kana characters, for example, the strings are first sorted according to the Kana characters and subsequently according to the ordinal values assigned to any dakuten and handakuten characters. This sorting method yields properly sorted character strings that contain both modified and unmodified characters.

Step 50: Create Expanded Character String

Figure 3:
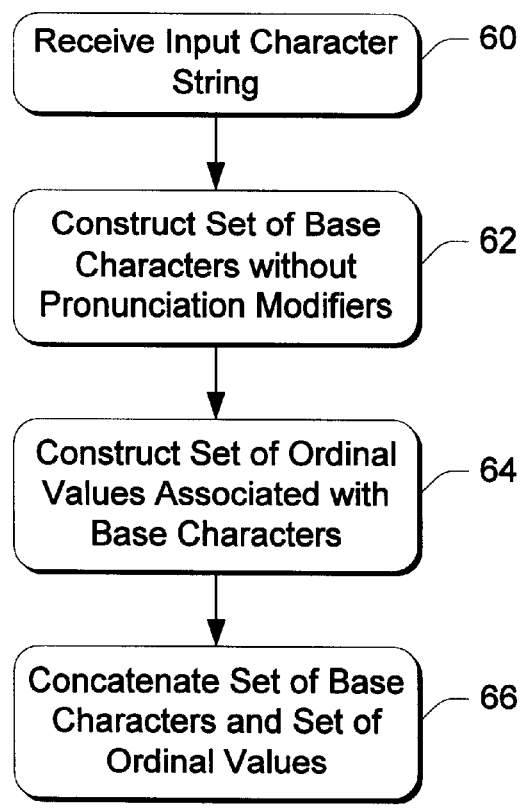
FIG. 3 is a flow diagram showing steps in a method for expanding the character string to an expanded character string containing characters and ordinal values, but without the pronunciation modifiers.

FIG. 3 shows a process for creating an expanded character string from an input string, labeled as step 50 in FIG. 2. At step 60, the sorting module 32 receives a source string of characters and pronunciation modifiers. To provide a fictitious example in English, suppose the degree symbol "°" and the tilde symbol "~" represent pronunciation modifiers that can be applied to a character. Furthermore, assume that the convention for this example dictates that a properly ordered list would have an unaccented character first, followed by a character accented with the degree symbol "°", followed by a character accented with the tilde symbol "~". Assuming the character is an "a", a proper sort would result as follows:

a
a°
a~

Next, suppose a character string consists of three letters "a a° a", where the second character is modified by the accent "°". According to the first step 60, the sorting module 32 receives a source string wherein each of the characters "a" and the lone accent "°" are treated individually. The source string is as follows:

a, a, °, a

At step 62 in FIG. 3, the sorting module 32 constructs a set of base characters from the source string. It does this by dropping the accents from the source string to produce the first set of base characters. In the above example, this step yields the following set of base characters:

a, a, a

At step 64 in FIG. 3, the sorting module 32 constructs a set of ordinal values from source string. The sorting module builds up the corresponding ordinal value by checking whether the subsequent item following a character is another character or an accent. Assume that an unaccented character is assigned the ordinal value "0", a character with the accent "°" is assigned an ordinal value "1", and a character with the accent "~" is assigned an ordinal value "2".

With the first "a", the process recognizes that this character is unaccented because it is followed in the source string by another character "a" and not an accent. Hence, the first ordinal value is a "0". At the next "a", the process detects that the subsequent item is the accent "°", indicating that the second "a" is modified by this accent. Hence, the second ordinal value is a "1". The next item in the source list—the accent "°"—is discarded as not being a character and the process continues to the last character "a". Here, the last character is not followed by anything, so it is deemed to be unaccented and is assigned an ordinal value "0". Step 64 thus yields the following set of ordinal values:

0, 1, 0

At step 66 in FIG. 3, the sorting module concatenates the two sets to form the expanded string containing the base characters plus their corresponding ordinal values. In this case, the sorting module returns the following expanded string.

a, a, a 0, 1, 0

Notice that the expanded character string has only characters and ordinal values. There are no pronunciation modifiers in the expanded string.

Step 52: Sort Expanded Character String

At step 52 in FIG. 2, the sorting module sorts a list of expanded character strings. The sorting module 32 sorts the strings according to the base characters and trailing ordinal values. As an example, suppose that the sorting module is attempting to sort the following five input strings:

a, a~, a°
a°, a, a~
a, b, a
a~, a, a°
a°, a~, a

The process of FIG. 3 described above returns the following expanded strings:

a, a, a 0, 2, 1
a, a, a 1, 0, 2
a, b, a 0, 0, 0
a, a, a 2, 0, 1
a, a, a 1, 2, 0

The sorting module 32 sorts the words or strings according to the leading base characters and trailing ordinal values. Here, the base characters "a, a, a" alphabetically precede the base characters "a, b, a". Thus, all four character strings beginning "a, a, a" precede the fifth character string of "a, b, a". The trailing ordinal values help sort the sets of strings that are identical in terms of their base characters, but differ due to the pronunciation modifiers. A value of "0, 2, 1" precedes a value of "1, 0, 2", and so forth. Accordingly, the five expanded strings are sorted as follows:

a, a, a 0, 2, 1
a, a, a 1, 0, 2
a, a, a 1, 2, 0
a, a, a 2, 0, 1
a, b, a 0, 0, 0

Notice that the ordinal values for the pronunciation modifiers are selected to yield the appropriate weight in the sorting process. That is, if the language dictates that a first accent type precede a second accent type in standard dictionary weighting, the first accent type is given a lower ordinal value than the second accent type.

The above results can be converted back to the original character strings with accented characters. In our example, the five strings would be sorted as follows:

a, a~, a° a°, a, a~ a°, a~, a a~, a, a° a, b, a

This sorting module can be implemented in many different contexts and computing environments. One particular environment of interest is the handheld computing device and the operating system that runs on such a device.

Figure 4:
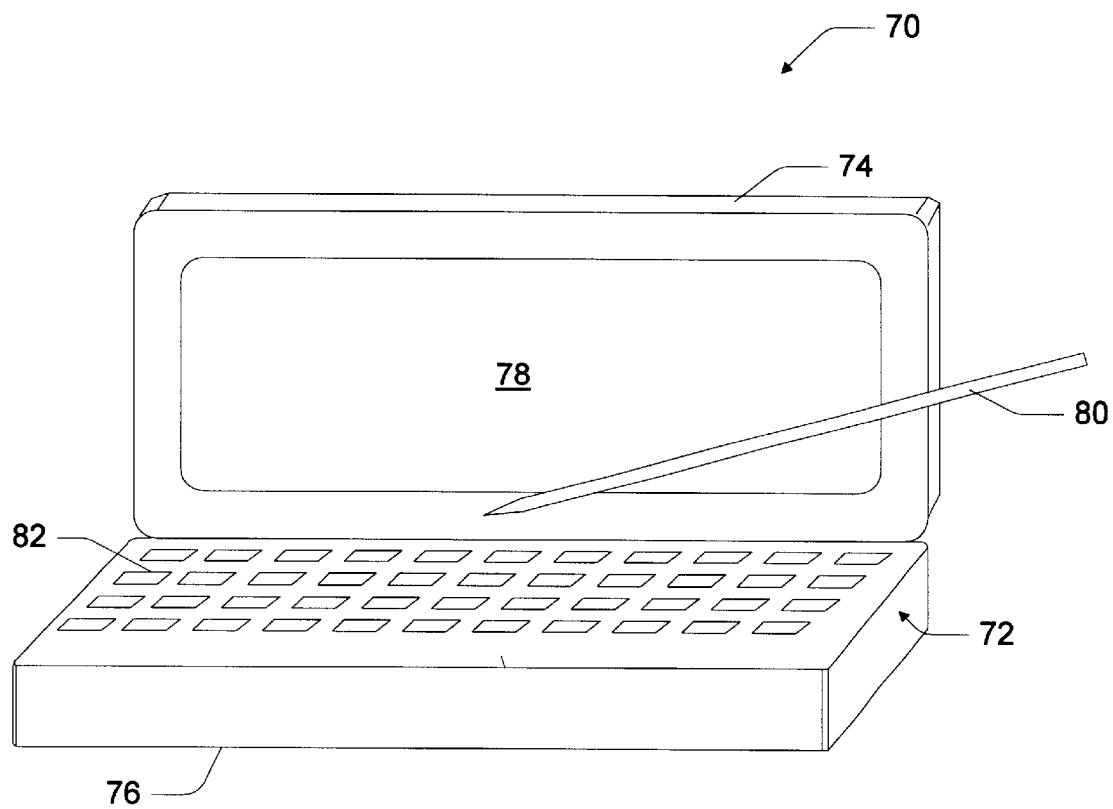
FIG. 4 is a perspective of a handheld computing device.

FIG. 4 shows a handheld computing device 70 according to one exemplary implementation. It has an enclosure 72 with a cover or lid 74 and a base 76. The lid 74 is hingedly connected to the base 76 to pivot between open and closed positions. The handheld computing device 70 has an LCD (liquid crystal display) 78 with a touch-sensitive screen mounted in lid 74. The device is equipped with a stylus 80 to enter data through the touchscreen display 78 and a miniature QWERTY keyboard 82. Both the stylus 80 and keyboard 82 are mounted in base 76.

Although the illustrated implementation shows a hinged, two-member handheld device 70, other implementations of handheld devices might comprise an integrated body without hinged components, as is the case with computerized notepads (e.g., PalmPilot® from 3COM Corporation). Moreover, there are many other ways to implement handheld computing devices that are capable of implementing aspects of this invention, including personal digital assistants, personal organizers, palmtop computers, computerized notepads, pagers, cellular phones, and other portable information appliances.

The handheld computing device 70 runs an operating system. As an example, the device runs the Windows CE operating system from Microsoft Corporation. This operating system is a derivative of Windows brand operating systems, such as Windows 95 or Windows 98, and is especially designed for handheld computing devices. However, the handheld computing device may be implemented with other operating systems.

The handheld computing device 70 also runs an email and address book application. One example application is Pocket Outlook, a derivation of Microsoft's Outlook application that integrates email, an address book, a task list, and calendar. The sorting module 32 can be implemented as part of the operating system or as part of the address book application.

The following code provides an example implementation of the sorting module 32. The code is designed to specifically handle Japanese character strings that contain both dakuten and handakuten characters. The code makes two passes through a source character string. A first pass removes the dakuten and handakuten accents from the source string (i.e., step 62 in FIG. 3). A second pass constructs the ordinal values (i.e., step 64 in FIG. 3). In this example, unaccented characters are assigned an ordinal value of "0"; characters with dakuten accents are assigned an ordinal value of "1"; and characters with a handakuten accents are assigned an ordinal value of "2".

```
LPWSTR GenerateYomiSortKey(LPWSTR pszSrc)
{
    LPWSTR pszKey = NULL;
    LPWSTR pszDst, psz;
    int nLen;
    nLen = (pszSrc ? wcslen(pszSrc): 0);
    pszKey = (LPWSTR)LocalAlloc(LPTR, (nLen + 1) * 2 *
        sizeof(WCHAR))*;
    if (!pszKey) goto Exit;
    if (!pszSrc || *pszSrc=='\0')
    {
        *pszKey = '†0';
        return pszKey;
    }
    pszDst = pszKey;
    psz = pszSrc;
    while (*psz)
    {
        switch (*psz)
        {
            case 0 × FF9E:
            case 0 × FF9F:
            case 0:
                break;
            default:
                pszDst++=*psz;
                break;
        }
        psz++;
    }
    *psz=pszDst++=' ';
    psz = pszSrc;
    while (*psz)
    {
        if(*(psz+1)==0 × FF9E)
        {
            *pszDSt='1';
            psz++;
        }
        else if(*(psz+1)==0 × FF9F)
        {
            *pszDst='2';
            psz++;
        }
        else
        {
            *pszDSt='0';
        }
        psz++;
        pszDst++;
    }
    *pszDst='\0':
Exit:
    return pszKey;
}
```

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for sorting character strings containing characters that are either unmodified or modified by one or more pronunciation modifiers, comprising the following steps:

expanding the character strings to expanded character strings, individual expanded character strings containing a set of base characters and a set of corresponding ordinal values, the ordinal values indicating whether the base characters are unmodified or modified with one of the one or more pronunciation modifiers; and sorting the expanded character strings.

2. A method as recited in claim 1, wherein the expanding step comprises the following steps:
constructing the set of base characters from the character string by removing the pronunciation modifiers from the character string; and
constructing the set of ordinal values from the character string by assigning different ordinal values to corresponding ones of the base characters depending upon whether the base characters are unmodified or modified by the one or more pronunciation modifiers.

3. A method as recited in claim 2, wherein the base characters that are modified by different pronunciation modifiers are assigned different ordinal values.

4. A method as recited in claim 1, wherein the sorting step comprises sorting first according to the base characters and secondly according to the ordinal values.

5. A method as recited in claim 1, further comprising the step of converting the expanded character strings, after sorting, back to their respective character strings.

6. A method comprising the following steps:
receiving a character string containing characters that are either unmodified or modified by one or more pronunciation modifiers; and
expanding the character string to an expanded character string containing the characters plus ordinal values indicative of whether the characters are unmodified or modified.

7. A method as recited in claim 6, wherein the expanding step comprises the following steps:
removing the pronunciation modifiers from the character string; and
assigning different ordinal values to corresponding ones of the characters depending upon whether the characters are unmodified or modified by the one or more pronunciation modifiers.

8. A method as recited in claim 7, further comprising assigning different ordinal values to the characters that are modified by different pronunciation modifiers.

9. A method comprising the following steps:
receiving a character string containing characters that are either unmodified or modified by one or more pronunciation modifiers;
removing the pronunciation modifiers from the character string to form a set of base characters without the pronunciation modifiers;
assigning ordinal values to corresponding ones of the base characters, the ordinal values differentiating among the base characters that are unmodified and base characters that are modified and also among the base characters that are modified by different pronunciation modifiers;
forming an expanded character string containing the base characters and their corresponding ordinal values; and
sorting the expanded character string.

10. A method as recited in claim 9, further comprising the step of converting the expanded character string, after sorting, back to the character string.

11. A computer-readable storage medium comprising computer-executable instructions for performing the following steps:
receiving a character string containing characters that are either unmodified or modified by one or more pronunciation modifiers; and
expanding the character string to an expanded character string containing the characters plus ordinal values indicative of whether the characters are unmodified or modified.

12. A computer-readable storage medium comprising computer-executable instructions for performing the following steps:
receiving a character string containing characters that are either unmodified or modified by one or more pronunciation modifiers;
removing the pronunciation modifiers from the character string to form a set of base characters without the pronunciation modifiers;
assigning ordinal values to corresponding ones of the base characters, the ordinal values being different depending upon whether the corresponding base characters are unmodified or modified by the pronunciation modifiers;
forming an expanded character string containing the base characters and their corresponding ordinal values;
sorting the expanded character string.

13. A computing device comprising:
a central processing unit (CPU) having a processor and a memory;
a sorting program stored in the memory and executable on the processor for sorting character strings that contain characters that are either unmodified or modified by one or more pronunciation modifiers; and
the sorting program being configured to expand the character strings to expanded character strings, individual character strings containing a set of base characters and a set of corresponding ordinal values, the ordinal values indicating whether the base characters are unmodified or modified with one of the one or more pronunciation modifiers, the sorting program also being configured to sort the expanded character strings.

14. A computing device as recited in claim 13, further comprising an operating system stored in the memory and executable on the processor, the sorting program being incorporated as part of the operating system.

15. A computing device as recited in claim 13, further comprising an application program stored in the memory and executable on the processor, the sorting program being incorporated as part of the application program.

16. A computing device as recited in claim 13, further comprising an application program stored in the memory and executable on the processor, the sorting program being incorporated as part of the application program.

17. A computing device as recited in claim 13, wherein the sorting program removes the pronunciation modifiers from the character string to form the base characters and assigns ordinal values to corresponding ones of the base characters, the ordinal values being different depending upon whether the corresponding base characters are unmodified or modified by the pronunciation modifiers.

18. A computing device as recited in claim 17, wherein the base characters that are modified by different pronunciation modifiers are assigned different ordinal values.

19. A computing device as recited in claim 13, wherein the sorting program sorts first according to the base characters and secondly according to the ordinal values.

20. A computing device as recited in claim 13, wherein the sorting program converts the expanded character strings back to their respective character strings.

* * * * *

UNITED STATES PATENT AND TRADEMARK OFFICE
CERTIFICATE OF CORRECTION

PATENT NO. : 6,243,701 B1
DATED : June 5, 2001
INVENTOR(S) : Shih et al.

It is certified that error appears in the above-identified patent and that said Letters Patent is hereby corrected as shown below:

Column 6,
Line 9, delete "*" after "sizeof(WCHAR))".
Line 13, change "*pszKey = '†0'" to -- *pszKey = '\0' --
Line 33, change "*pszDSt='1'" to -- *pszDst='1' --

Signed and Sealed this

Fifth Day of March, 2002

Attest:

JAMES E. ROGAN
Attesting Officer         Director of the United States Patent and Trademark Office